W. J. COOK.
MANURE SPREADER.
APPLICATION FILED AUG. 20, 1919.
1,350,296.
Patented Aug. 24, 1920.
2 SHEETS—SHEET 1.
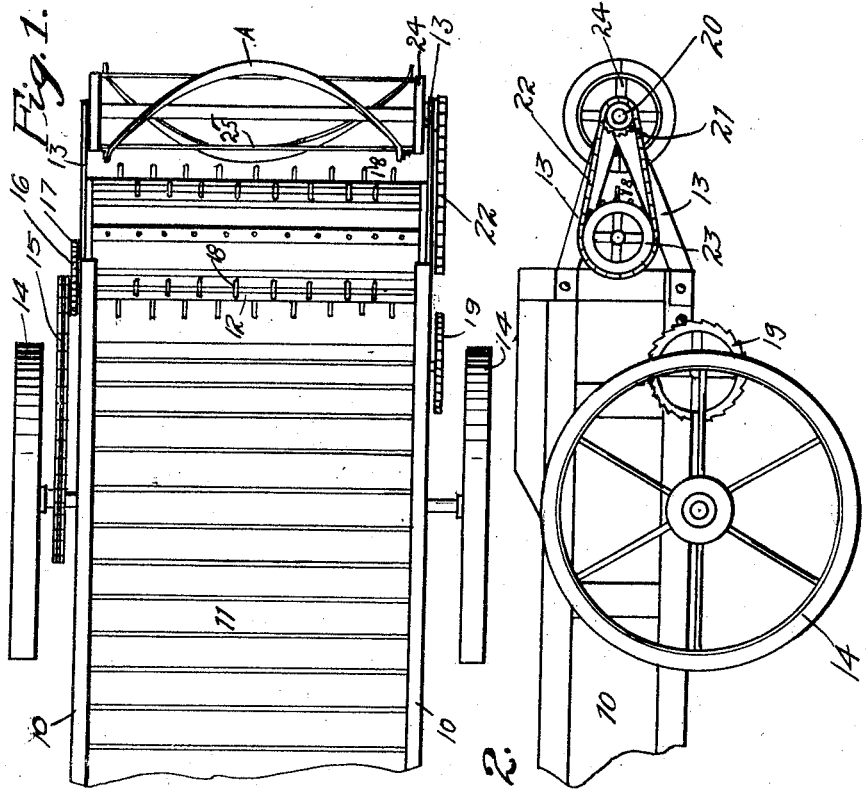

W. J. COOK.
MANURE SPREADER.
APPLICATION FILED AUG. 20, 1919.

1,350,296.

Patented Aug. 24, 1920.
2 SHEETS—SHEET 2.

WITNESS

INVENTOR
Willard J. Cook.
BY Orwig & Bair
ATTYS

UNITED STATES PATENT OFFICE.

WILLARD J. COOK, OF DES MOINES, IOWA.

MANURE-SPREADER.

1,350,296.  Specification of Letters Patent.  Patented Aug. 24, 1920.

Application filed August 20, 1919. Serial No. 318,724.

*To all whom it may concern:*

Be it known that I, WILLARD J. COOK, a citizen of the United States, and resident of Des Moines, in the county of Polk and State of Iowa, have invented a certain new and useful Manure-Spreader, of which the following is a specification.

The object of my invention is to provide a manure spreader of simple, durable and inexpensive construction.

A further object of my invention is to provide a spreader adapted to distribute the fertilizer over a path of greater width than the width of the spreader itself.

A further object of my invention is to provide means whereby the fertilizer spread over the comparatively wide path may be evenly distributed throughout the width of the path.

A further object of my invention is to provide a spreader having means adapted to carry a load of fertilizing material, means for breaking up or pulverizing the material, and then means for distributing the pulverized or broken-up material evenly over a comparatively wide path.

A further object of my invention is to provide a distributing or spreading cylinder having blades thereon adapted to catch the material from the pulverizing cylinder and to throw the material onto the ground.

A further object of my invention is to provide such a distributing cylinder with blades secured thereto adapted to throw the material received thereon in such directions that a path of greater width than the spreader may be uniformly and evenly covered by the fertilizer.

A further object of my invention is to provide blades secured to the distributing cylinder curved throughout their lengths and curved a proportionately greater amount near their ends than at their central portions.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of my spreader.

Fig. 2 shows a side elevation of the spreader.

Fig. 5 is a top or plan view of a modified form of distributing cylinder, shown as being disconnected from the spreader.

Figure 3:
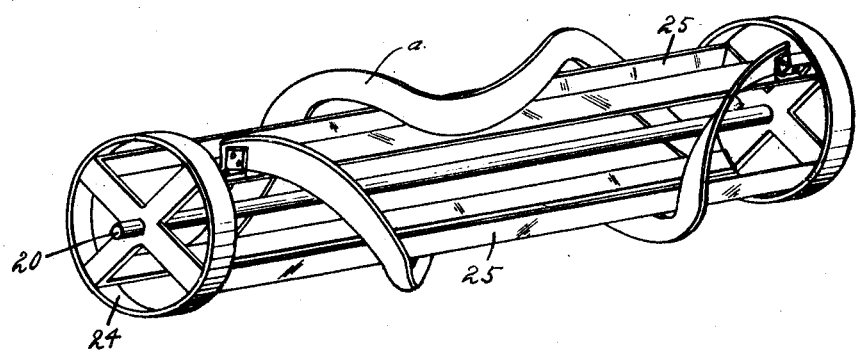
Fig. 3 shows a perspective view of the distributing cylinder.

Referring to the accompanying drawings, I have used the reference numeral 10 to indicate the side members of the bed of my spreader, between which is extended a conveyer or apron 11 adapted to form a bottom for the bed and to be moved longitudinally relative to the bed to carry the fertilizer to position where it may be operated upon by a pulverizing cylinder 12.

The pulverizing cylinder 12 is journaled between rearwardly extending brackets 13 and driven from traction wheels 14, by means of a chain 15 and gear wheels 16 and 17, the latter being adapted to reverse the direction of movement, so that the upper portion of the cylinder 12 will be moving rearwardly relative to the spreader.

In this connection, it may also be mentioned that the cylinder 12 is provided with a plurality of teeth 18 and travels at a comparatively high rate of speed, so that the teeth coming in contact with matted or lumpy fertilizer will pulverize the same.

A ratchet wheel 19 is fixed to a shaft adjacent to the rear end of the members 10 and may be connected in any suitable way with one of the traction wheels 14 to thereby intermittently or continuously move the conveyer 11 to bring predetermined quantities of the load of fertilizer thereon in contact with the pulverizing cylinder 12.

The brackets 13 carry at their rear ends a shaft 20, having a sprocket 21 mounted thereon, which is driven by a chain 22, the latter being extended over a sprocket 23 which is secured to one end of the shaft carrying the pulverizing cylinder 12.

The sprockets 21 and 23 are of such size that the shaft 20 will rotate at a considerably higher speed than does the shaft carrying the pulverizing cylinder.

Mounted on the shaft 20 between the brackets 13 is a distributing cylinder, comprising end disks 24 between which are extended slats 25 adapted to support my distributing blades. The distributing blades are so arranged that they will receive the fertilizer from the pulverizing cylinder 12, and it will be noted that the chain 22 drives the distributing cylinder in the same direction as the pulverizing cylinder, so that the material received by the blades will be thrown rearwardly relative to the spreader.

If, however, the material is thrown directly rearwardly from the spreader, it will be seen that the ground covered by the fertilizer will be substantially of the same width as the spreader is, so that if the spreader is four feet wide, it will be necessary to make one trip across the field for each four feet of width of the field.

In order, however, to lessen the number of trips across the field necessary to cover the field with fertilizer I provide the following described means.

The distributing cylinder is provided with a pair of blades "A", which have their side surfaces lying in radial lines extended from the axis of the cylinder and which are curved throughout their length. The central portion of the blades "A" are curved considerably less than are the end portions, and the curvature of the blade increases gradually from the center thereof out to the end.

Figure 4:
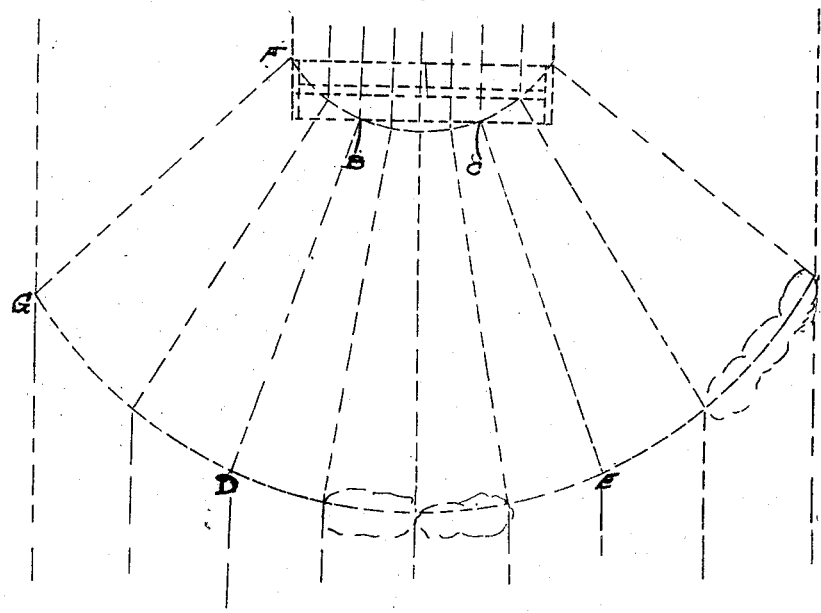
Fig. 4 is a diagrammatic view of the distributing cylinder and the path over which the fertilizer is distributed, to illustrate the operation of the parts.

Referring to the diagram, Fig. 4, it will be seen that the central portion of the blade, as the portion between the points "B" and "C", will receive a considerable portion of the fertilizer from the pulverizing cylinder 12, and will throw the fertilizer rearwardy to position substantially along the arc "DE". It will be noted that the arc "DE" also covers a considerable portion of the width of the path upon which the fertilizer is dropped while the portion "BF" of the blade "A" throws the fertilizer therefrom to the positions indicated substantially by the arc "DG", which is of considerable less width relative to the path upon which the fertilizer is thrown than the space covered by the arc "DE".

It will therefore be seen that the width of the layer of fertilizer thrown by any portion of the blade "A" is proportionate to the curvature of that part of the blade.

By this construction, I am therefore able to properly vary the curvature of the blade "A", so that the fertilizer thrown to the ground may be thrown a distance substantially the same at all points from the distributer blade and at the same time cause the layer thrown to be of uniform thickness throughout.

I am aware that a similar result has been accomplished by the use of blades which are wider at their ends than at their central points, but with such blades, there is a proportionately greater expense of manufacture and a greater danger of breakage, and the outer edges are not at all times equally distant from the teeth of the pulverizing cylinder.

It will be obvious that my blade may be formed from what is termed "stock strips" of sheet metal and that little or no special machinery is required for its installation. The cost of replacing an original manufacture is thereby materially lessened. In the form of device shown in Fig. 5, the variation in curvature of the blade is accomplished by securing a considerable number of pieces of straight sheet metal to the drum with their ends abutting against each other and arranged so that each successive piece, as the pieces approach the outer end of the drum, forms a smaller angle with the preceding piece.

It will be seen that with this form of structure, a portion of a broken blade may be replaced with considerably less expense than would be the case if it were necessary to replace an entire blade, while the effect of the straight strips placed end to end remains substantially the same as a continuous curved blade.

Some changes may be made in the construction and arrangement of the parts of my improved device, without departing from the essential features and purpose of my invention, and it is my intention to cover by my claims any modified forms of structure or use of mechanical equivalents, which may be reasonably included within their scope.

I claim as my invention:

1. In a device of the class described, a distributing cylinder comprising a drum and a blade having one edge secured to the surface of the drum and its side surfaces arranged in planes parallel with lines radiating from the axis of the drum, said blade being curved on its longitudinal axis from end to end, and increasing in curvature toward said ends.

2. In a device of the class described, a spreader having an apron in the bottom thereof adapted to feed material rearwardly, a drum mounted at the rear end of said apron and adapted to pulverize the material received therefrom, and a spreading cylinder disposed rearwardly of the pulverizing cylinder, having blades mounted thereon of equal width throughout their length, and adapted to deposit fertilizer upon an arc of greater width than the width of the spreader.

3. In a machine of the class described, a distributing cylinder, means for rotating it, material engaging blades fixed to the distributing cylinder, said blades being so positioned that their side working faces are substantially radial to the center of the cylinder, and being also so arranged that said working faces are substantially parallel to the axis of the cylinder at the central portion thereof, and at angles approximately forty-five degrees at the ends of the cylinder, and at angles midway between parallel and forty-five degrees to the axis at the intermediate points, whereby the material will be thrown rearwardly and outwardly along divergent lines, that at the center, approximately rearwardly, and that at the ends, outwardly and rearwardly, and that at intermediate points, midway between the two said directions.

4. In a device of the class described, a distributing cylinder comprising a shaft, disks secured to said shaft adjacent to either end thereof, slats secured to said disks and extended therebetween adjacent to the outer edges of said disks, and blades of equal width throughout their length secured to said slats with their side surfaces lying in planes substantially parallel with lines radiating from said shaft, said blades being curved upon their longitudinal axis from end to end and having greater curvature adjacent to their end portions than adjacent to their central portions.

5. In a distributing cylinder for spreaders, a drum, means for rotating said drum, means for feeding material onto the periphery of said drum, and a plurality of blades extended from the periphery of said drum, the blades or parts of blades adjacent to the ends of the drum being disposed at greater angle relative to the longitudinal axis of the drum than are the blades or parts of blades adjacent to the central portion of the drum, whereby material received on the drum adjacent to the ends thereof may be thrown a greater distance laterally than that received adjacent to the central portion of the drum.

6. In a machine of the class described; a wheel mounted frame, a body member thereon, having means in the bottom thereof adapted to move material thereon rearwardly, a pulverizing cylinder disposed at the rear end of said bottom, and adapted to receive the material therefrom, means for rotating said pulverizing cylinder, whereby the material received thereby may be pulverized, a distributing cylinder disposed rearwardly of the pulverizing cylinder, and means for rotating the distributing cylinder at a relatively greater speed than the pulverizing cylinder, whereby material received thereby from the pulverizing cylinder may be further pulverized by its contact with the distributing cylinder, and material engaging blades fixed to the distributing cylinder, said blades being so positioned that their side working faces are substantially radial to the center of the cylinder, and being also so arranged that said working faces are substantially parallel to the axis of the cylinder at the central portion thereof, and at angles approximately forty-five degrees at the ends of the cylinder and at angles midway between parallel and forty-five degrees to the axis at the intermediate points, whereby the material will be thrown rearwardly and outwardly along divergent lines, that at the center approximately rearwardly, and that at the ends outwardly, and rearwardly, and that at intermediate points midway between the two said directions.

7. In a device of the class described, a distributing cylinder, comprising a drum and blades secured to the periphery thereof, said blades being of equal width and arranged with their side surfaces lying in planes parallel with lines radiating from the axis of the drum, and being so arranged that the longitudinal axes of said blades adjacent to the ends of the drum form greater angles relative to the axis of the drum than those adjacent to the center of the drum, whereby material received by said blades, when the drum is rotated, may be thrown a substantially uniform distance from the blade, but the material thrown upon lines forming less angles with the axis of the drum, than do the lines upon which the material is thrown from adjacent to the center of the drum.

Des Moines, Iowa, August 6, 1919.

WILLARD J. COOK.